United States Patent [19]

Swenson

[11] 3,987,693

[45] Oct. 26, 1976

[54] HEAVY-DUTY LIVE CENTERS

[76] Inventor: Henry F. Swenson, 22 Holmehill Lane, Roseland, N.J.

[22] Filed: Dec. 23, 1975

[21] Appl. No.: 643,909

[52] U.S. Cl. .............................. 82/33 R; 76/101 R; 82/30
[51] Int. Cl.² .......................................... B23B 23/04
[58] Field of Search ........................... 82/33, 31, 30; 76/101 R

[56] References Cited

UNITED STATES PATENTS

| | | | |
|---|---|---|---|
| 1,984,718 | 12/1934 | Wistrand | 82/30 |
| 2,142,639 | 1/1939 | Fish | 82/33 R |
| 2,798,396 | 7/1957 | Lee | 82/33 R |

FOREIGN PATENTS OR APPLICATIONS

| | | | |
|---|---|---|---|
| 1,157,137 | 12/1957 | France | 82/30 |
| 473,946 | 3/1929 | Germany | 82/31 |
| 260,355 | 8/1970 | U.S.S.R. | 82/33 |

*Primary Examiner*—Leonidas Vlachos
*Attorney, Agent, or Firm*—Ralph R. Roberts

[57] ABSTRACT

This invention pertains to the construction and method of construction of heavy-duty live centers having a workpiece carrying capacity of from 35 to 250 tons. A quill-type outer member is employed with heavy-duty roller bearings in one portion of this center. Minimum capacity of this type of center is more than a 10 ton workpiece. The rotating spindle in this quill is designed to be supported by heavy-duty bearings which are so mounted in the bore in the quill housing that the spindle is allowed to bow to a determined extent, this bowing occurs when the spindle is loaded with a heavy workpiece. A heavy-duty self-aligning angular radial bearing assembly is carried in the front end of the bore of this live center. An angular roller thrust bearing having a determined outer race is fitted into a bore which is a determined amount oversized and enables the bearing to move into misalignment of the theoretical center line so that the actual center of the bearing and the center of the live spindle, when bowed with the load of the workpiece, is in coincidence. The amount of bowing of the spindle because of the loading of the workpiece is a function of the load in accordance with the diameter of the spindle.

14 Claims, 3 Drawing Figures

HEAVY-DUTY LIVE CENTERS

BACKGROUND OF THE INVENTION

1. Field of the Invention

With respect to the classification of art as found in the United States Patent and Trademark Office the present invention pertains to the general Class entitled, "Turning" (Class 82) and more particularly to the subclass therein entitled, "centers" (subclass 33).

2. Description of the Prior Art

Live centers are well known and generally fall within three categories, light, medium and heavy-duty depending upon the capacity. These classifications will hereinafter be more fully described. In general the live centers as shown in the art and as used by industry accommodate up to 10 tons very satisfactorily. However, when the capacity exceeds 10 tons and up to 250 tons such heavy loads shorten the life of the bearing in the live centers particularly when radial bearings are employed. Centers requiring extremely heavy-duty load capacity are generally highly stressed and where the rotating spindle of the live center accepts and supports a very heavy work load the concentrated load upon these bearings becomes extremely high and their life and accuracy are shortened. It is a purpose of this invention to provide, and it does provide, a heavy-duty live center which will accept and continue to operate with ultra precision while supporting a very heavy workpiece load of from 10 to 250 tons.

In order to establish definition for the purpose of this description, a live center is a work holding device having a center point carried in the spindle mounted in antifriction bearings with the center point supported and rotating with the workpiece.

Conventionally there are three categories of live centers and these three categories of live centers are illustrated in the drawings. The light-duty live center is adapted to be used with a 1,000 pound or less workpiece and generally has two bearings mounted back to back. The medium-duty live center will accept up to 10 tons in a workpiece and includes several bearing designs, usually one or two front bearings and one or more rear bearings with the front bearings often being roller-type bearings. Finally the heavy-duty live center accepts from 50 to 250 ton workpieces. These heavy-duty live centers have quill-type bodies with very heavy-duty bearing construction. Where the required carrying capacity is approximately 35 tons, the smallest in the heavy-duty category, at least a 36 jarno taper which is about 4½ inches at the gauge line is used. For this heavy-duty capacity and up to 250 tons there are generally three bearings at the foreportion of the live center and the bearings closest to the center point are called the front bearings and those toward the shank are called rear bearings. Heavy-duty live center designs usually incorporate needle or straight roller front bearings which have a very heavy radial capacity. When such bearings are used periodic adjustment of the bearings according to preload is necessary to compensate for bearing wear. It has been found that when a disassembly of the live center is required for bearing adjustment, which disassembly is seldom performed, it is often unsatisfactory. After the adjustment has been performed the center point will no longer maintain its true center but must be reground. Tool pressure and other loads cause the center points of improperly adjusted bearings in quills to become eccentric. Deep group ball bearings may have a good radial capacity but are not suitable for front bearings since a radial adjustment cannot be made. As the bearing wears the center point starts to move erratically causing an outrun of the workpiece. Where two tapered roller bearings are used, with the rear bearing mounted to take the thrust, looseness also develops from wear. This allows the spindle to follow a planetary motion unless bearing preload is carefully adjusted as wear takes place. A front tapered roller bearing assembly is best suited for absorbing both radial and axial loads due to the wedging of the bearings under thrust. A live center employing this type of front bearing is especially suited for cylindrical grinding where neither thrust nor rotating speed is too high. Tapered roller bearings are less suitable for lathe work due to their inherent poor thrust capacity and heat buildup at higher turning speeds. It is also necessary to have automatic preload on a bearing of this type to sustain accuracy and achieve maximum bearing life.

Nearly all live center manufacturers provide bearing preload at assembly. Bearing adjustment due to wear is handled in two ways, manual and automatic. When manual adjustment is internal the live center must be disassembled. This is impractical. Even when the preload arrangement is accessible adjustment for wear is nearly always neglected. Centers with an automatic preload arrangement require neither disassembly nor manual adjustment. Such a center is provided in the present application.

For heavy work loads the spindle should be supported on approximately a 1 to 4 ratio. A self-aligning construction is essential to safeguard against damage to the bearings since the spindle will bow under a heavy work load.

For medium work loads a short heavy spindle works best. This type of spindle eliminates excessive bowing and deflection which is damaging to bearings. Some live center designs incorporate a long slender spindle. This spindle may flex under heavy load and cause rapid deterioration of some or all of the bearings. When the spindle flexes thrust is no longer distributed evenly to the thrust carrying bearings since only a few balls now support the work load and a force is created by the flexing of the spindle. Premature bearing failure results. Excessive flex has been found to cause the spindle to fatigue to the point of breakage.

Normally a live center's capacity rating is based on the total workpiece weight. This is often misunderstood since a workpiece is supported on both ends and the live center is designed to support only half of the total workpiece weight. Tool pressure and thrust are also to be considered. To support a workpiece between 60° center points requires a minimum end thrust of 25 percent of the workpiece weight. Since end thrust increases from heat expansion it is recommended that a center with a high thrust capacity be used. When a bearing is subjected to a load of only one-half its maximum rating the life expectancy of that bearing increases 8 times. Using a live center with more capacity than needed is a safeguard against bearing failure due to overload.

Venting of the internal cavity of a live center is necessary to prevent the exhaling of bearing lubricant during heat buildup and the inhaling of coolant as the live center is often flooded at the beginning of a cut.

In constructing a live center it is essential to maintain concentricity between bearing bores and thrust carrying shoulders. Spindles should be round and have a true running thrust carrying flange. Bearings should fit both the body and spindle with a moderate press fit. Class of bearings has little to do with a live center's accuracy if the point is ground after assembly in its own bearings under simulated work conditions. This method in the live center, to be hereinafter described, with a close supervision normally produces a total indicator reading (TIR) of 0.000010 to 0.000050. Automatic preload takeup is also essential to maintaining constant radial and axial precision and provides maximum bearing life.

SUMMARY OF THE INVENTION

This invention may be summarized at least in part with reference to its objects.

It is an object of this invention to provide, and it does provide, a heavy-duty center in which the bearings carrying the spindle are so arranged that a normal deflection of the spindle due to heavy work load is allowed to develop and with the bowing of the spindle the bearings are misaligned from their normal alignment to the extent that the bearing load of the bowed spindle is substantially equalized allowing the bearing to perform its normal load functions absent local overloading.

It is a further object of this invention to provide, and it does provide, a heavy-duty center in which a tapered, angular roller bearing is carried in an enlarged bore which is sufficient to allow the bearing to be moved from its normal axial alignment to an extent equal to the bowing of the spindle to permit the thrust bearing to align with the center line of the bowed spindle to equalize the bearing during normal load function.

Essentially this heavy-duty spindle has a quill housing and a heavy-duty bearing construction with the foreportion of this housing bored to accept a pair of angular roller bearings back to back. These bearings are of a selected size sufficient to carry the main radial load of the spindle. In a bore adjacent to the front bore and to the rear thereof a tapered angular roller bearing combining both radial and thrust capacity is carried in a bore of determined enlargement so that when the anticipated deflection of the spindle occurs the bearing is moved to a new position in the bearing bore corresponding to the deflection of the spindle. As thus positioned the bearing causes and enables the thrust load on the bearing to be equalized. With the equalizing of the load on the thrust bearing the anticipated and calculated deflection of the spindle which occurs when the heavy loads are carried does not destroy nor misalign the thrust bearing which is moved out of axial alignment and corresponds accordingly to a central and equalized pressure on the thrust bearing.

In addition to the above summary the following disclosure is detailed to insure adequacy and aid in the understanding of the invention. For this reason there has been chosen a specific embodiment of the heavy-duty live center shown in various capacities as adopted for use with a tailstock of a lathe or grinder and showing a preferred means for constructing this center. This specific embodiment has, and prior art embodiments of live centers have, been chosen for the purposes of illustration and description as shown in the accompanying drawings wherein:

BRIEF DESCRIPTION OF THE DRAWINGS

In the following description and in the claims various details are identified by specific names for convenience. These names, however, are intended to be generic in their application. Corresponding reference characters refer to like members throughout the three figures of the drawings.

The drawings accompanying, and forming part of, this specification disclose certain details of construction for the purpose of explanation but it should be understood that structural details may be modified in various respects without departure from the concept and principles and that the invention may be incorporated in other structural forms than shown.

LIGHT-DUTY LIVE CENTER OF FIG. 1

Figure 1:
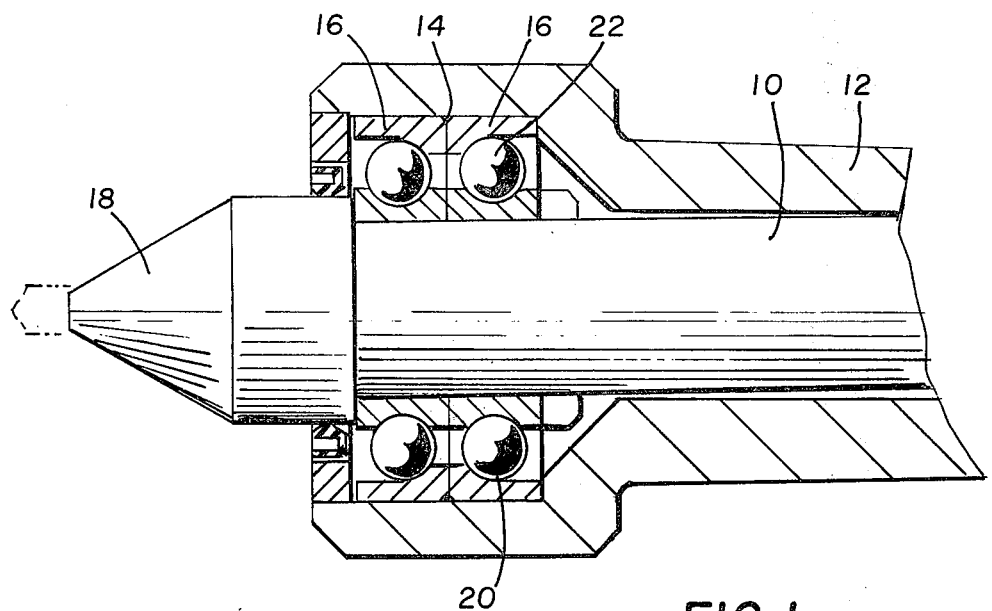
FIG. 1 represents a prior art live center in which two deep groove ball bearings, back to back, are disposed to carry a spindle on a quill, this live center corresponds to those generally used for light-duty.

Referring now in particular to FIG. 1, there is depicted a spindle 10 carried in and by a quill 12. A bore 14 formed in the foreportion of the quill has therein mounted a pair of deep groove ball bearings 16. These bearngs are mounted in a back to back relationship. When a heavy workpiece is supported by this live center and particularly on the point 18 of the quill 10, and although the rear end of the quill is supported by other bearings, the quill itself bows or bends a small amount causing concentrated loads to be applied to the bearings 16. This occurs at the lower point indicated as 20 and at the same time the bow of the spindle causes the rear bearing 16 to be lifted upwardly concentrating the load on this bearing at point 22. If the preload is not maintained and if the weight of the workpiece causes the load on the bearings to approach the limit ratings of these bearings and rapid and excessive wear develops and the spindle runs eccentric.

LIVE CENTER OF FIG. 2

Figure 2:
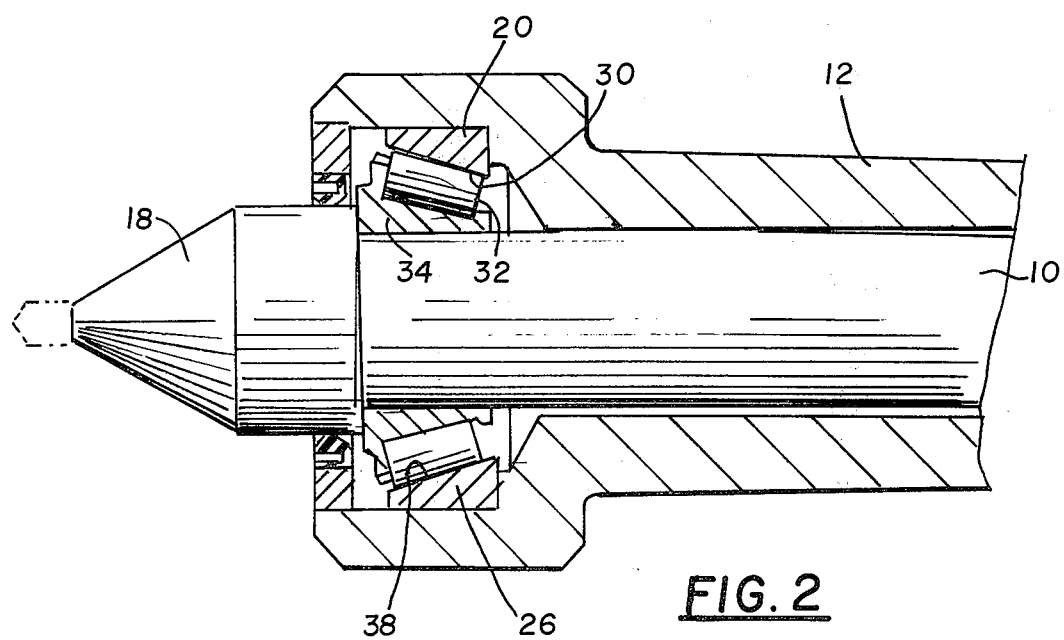
FIG. 2 represents a prior art live center having a medium-duty load in which a tapered roller bearing is used.

In FIG. 2 is shown a live center in which the spindle 10 is also carried in a quill 12 in the manner shown in FIG. 1. Instead of a pair of ball bearings this center utilizes a tapered roller bearing 26. A workpiece when placed upon the point 10 is a heavy load in the nature of 10 tons or more and causes the spindle 10 to bow, as indicated in the drawing. The tapered roller bearing rapidly wears the outer raceway 28 having an excessive upward load applied at the point 30. The tapered roller 32 as the spindle bows causes the center race 34 to move with the bow of the spindle. With this bowing of the spindle, as indicated in the drawing, the outer raceway at its forward portion accepts this load at a concentrated point 38. This misalignment of the tapered bearing under a heavy load causes excessive stress at two points and the longevity of such a bearing is drastically cut as well as the accuracy of such a live center spindle. In a very short time the quill moves in an eccentric manner due to the play in the bearing. Even a self-adjusting means provided in such a center does not compensate for the excessive wear that occurs at these forward and rear points. Since the center is often removed for reinstallation at a later time of use and since there is no particular correlation of the positions of the bowing of the center, the wear caused by the bowing of the spindle as moved around the bearing as well as the previous wear problems are only magnified.

PREFERRED EMBODIMENT OF FIG. 3

Figure 3:
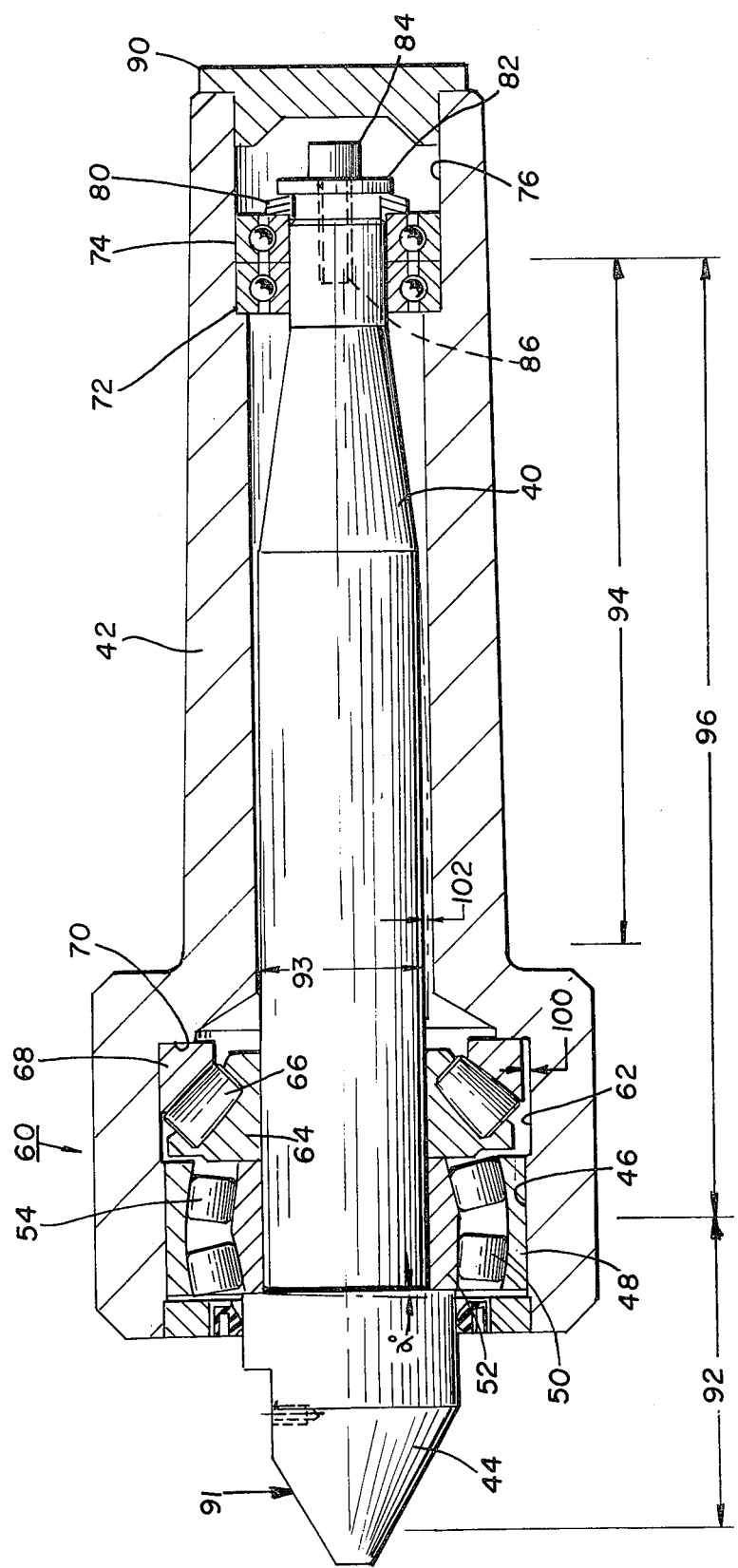
FIG. 3 represents, in substantial detail, the heavy-duty live center of this invention showing in particular the relationship of the front bearings and the thrust bearing as they accept the heavy-duty load on the quill.

Referring next and finally to FIG. 3, there is depicted a heavy-duty live center in which the spindle 40 is carried in a quill 42. On the forward end of this quill is a 60° point 44. On this forward portion of the quill a flat, tapped hole may be provided so that a drive dog may be positioned on the spindle so that the spindle positively turns with the workpiece to eliminate any possibility of the workpiece sliding around on the point as the workpiece is turned. This insures that the workpiece and the spindle will turn at the exact same speed. A front bore 46 formed in the quill 42 carries a self-aligning roller bearing 48. This radial-type bearing is a bearing that can accept extreme heavy radial loads and has a self-aligning feature permitting a small amount of bow or bend in the spindle 40 to occur with the bearing adjusting itself to this small amount of bow. This bearing allows a small amount of misalignment of the center race with the outer race which accommodates the bow or bend in the spindle 40. This bending or bowing of the spindle occurs because of the extremely heavy loads and the front row of the front grouping of roller bearings 50 move slightly to accommodate the arrangement and displacement of the inner race 52. At this same time the radial load of the rear row of bearings 54 is accommodated by the spherical inner surface of the outer race 48. This self-aligning bearing, therefore, is able to accommodate a large quantity of radial load without undue stress on the race 48 and on the roller bearings 50 and 54. Since the aforementioned heat buildup and thrust of such a heavy-duty spindle live center can become quite excessive it is contemplated that a self-aligning spherical roller thrust bearing 60 will be carried adjacent the radial bearing. To accommodate the bow of the spindle when a heavy load is placed thereupon it is contemplated that this spherical roller bearing 60 will be carried in a slightly oversized bore 62. The length of this bore is precisely made so that the inner race 52 engages the inner race 64 of the spherical roller bearing and with the determined preload of these bearings the roller 66 engages the outer tapered race 68 in a manner to cause a slight snug engagement of the rear or left face 70 of the bore 62. It is to be noted that although the outer race 68 is the same diameter of the outer race 48, the bore 62 is several thousandths of an inch in diameter larger than the bore 46.

The tail or right end of spindle 40 is carried by antifriction roller bearings 72 and 74 which are carried in the bearing recess 76 formed in the quill 42. A pair of Belleville-type washers 80 is tightened or deflected by a collar member 82 which is tightened into position by means of a cap screw 84 which is advanced into a tapered hole 86 as indicated. A plug 90 closes the rear end of the quill to dirt, unwanted fluid and the like.

Referring still to the drawing of FIG. 3, it is to be noted that a mathematical calculation has been established and a heavy-duty live center of this design utilizing self-aligning radial bearing assemblies must employ a heavy-duty thrust bearing. This highly efficient, long-life and accurate center must have a self-compensating preload. Six centers of increasing capacity are listed according to the attached chart:

| Type | P pounds | C inches | D inches | I in.$^4$ | $X_d$ inches | $\delta$ inches | BC (min)in. |
|---|---|---|---|---|---|---|---|
| A-7 | 45,000 | 3.375 | 2.312 | 1.40 | 9.54 | .064 | .016 |
| A-8 | 57,000 | 3.50 | 2.687 | 2.55 | 9.89 | .049 | .012 |
| A-9 | 93,000 | 3.75 | 3.50 | 7.36 | 10.60 | .034 | .008 |
| A-10 | 102,000 | 3.625 | 3.50 | 7.36 | 10.25 | .034 | .008 |
| A-11 | 128,000 | 4.25 | 4.312 | 16.97 | 12.37 | .030 | .0075 |
| A-12 | 156,000 | 4.50 | 4.687 | 23.68 | 12.72 | .031 | .008 |

In the above chart

P = maximum capacity of front bearing
C = distance from loading to center line of front radial brg.
D = spindle diameter between front and rear bearings
I = moment of inertia of spindle
$X_d$ = distance from rear bearings to point of max. deflection
$\delta$ = deflection of spindle at $X_d$
BC = thrust bearing radial clearance (25% $\delta$ minimum)

Calculated Data

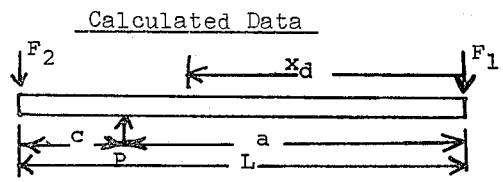

Equation No. 1 $\quad X_d = \sqrt{\dfrac{a(2L-a)}{3}}$ (distance to point of maximum deflection)

Equation No. 2 $\quad \delta = \dfrac{Pa(L-2)(2L-2)}{27\,E\,I\,L}\sqrt{3a(2L-a)}$
(Maximum deflection)

In type A Live Centers as in above chart L = 5C and a = 4C therefore

Equasion No. 1 becomes $X_d = 8C^2$

Equation No. 2 becomes $\delta = \dfrac{P(40.72\,C^3)}{27\,E\,I}$ where E = modulus of elasticity
I = moment of inertia
Example A 7 live center with
P = 45,500 lbs. max.
C = 3.375 inches
D = 2.312 inches
E = 29 × 10$^6$ lbs./inches$^2$
Determine
I (moment of inertia)
$X_d$ (point of maximum deflection)
$\delta$ (maximum deflection)

-continued $$I = \frac{\pi D^4}{64} = \frac{\pi (2.312)^4}{64} = 1.40 \text{ inches}^4$$

$$X_d = \sqrt{8C^2} = \sqrt{8(3.375)^2} = 9.54 \text{ inches}$$

$$\delta = \frac{P(40.72\ C^3)}{27\ E\ I} = \frac{45,500 \times 40.72 \times (3.375)^3}{29 \times (10)^6 \times 1.4 \times 27}$$

$$\delta = .064 \text{ inches}$$

In this chart as shown six centers with increasing load carrying capacities in which the work load is indicated as applied at point 91. These loads are varied by a radial bearing whose capacity may vary from 45,500 pounds to 156,000 pounds. This is one-half of the total weight of the workpiece. These six sizes and the chart number associated therewith list the maximum capacity of the front radial bearing; the distance from the load to the center line of the front radial bearing indicated as distance 92; the spindle diameter between the front and rear bearings which is diameter 93; I is the calculated moment of inertia in the spindle; 94 is the distance from the rear bearing to the point of maximum deflection; 96 is the distance from the front radial bearing to the center line of the rear bearing. The maximum deflection of the spindle is at the left end of dimension 94. Dimension 100 is the minimum clearance provided in bore 62 and allows the thrust bearing to be displaced from the theoretical center line. This is approximately 25 percent of the maximum deflection of the spindle. For example, it is to be noted in the above chart that the maximum radial clearance for the type A7 live center is sixteen-thousandths of an inch; for the type A8 center the clearance is twelve-thousandths of an inch and for the A9, A10, A11 and A12 center it is approximately eight-thousandths of an inch. The decrease in deflection of the spindle in the larger diameter capacity centers is caused by the increase in the size of the spindle which, of course, drastically increases the momentum of inertia as well as the stiffness of the spindle.

As reduced to practice, it has been found that when the live centers built for the capacity indicated in the chart are loaded to their capacity the bearing race 68 is moved by the deflection 102 of the spindle and this outer race moves against and along wall 70 until it equals the displacement of the spindle or is stopped by the enlarged outer diameter 62. This displacement of the thrust bearing allows the thrust bearing to be aligned in substantially a precise alignment corresponding to the deflection of the spindle. The spindle is bowed to the indicated deflection by the load applied at point 91. When the front bearing is allowed to move to accommodate this deflection and the thrust bearing rear race slides on surface 70, the thrust bearing moves into a concentric alignment with the bowed spindle. When the thrust load initially applied is increased by the heating of the workpiece, this load is accepted over the full diameter of the displaced thrust bearing. When the load and the center line of the bowed shaft are in coincidence both the capacity and the longevity as well as the accuracy of the thrust bearing is maintained. The self-aligning bearing adjusts to equally support the load rather than at concentrated points as occurs when the shaft is not permitted to bow resulting in the radial load and the thrust load being concentrated at localized points which, of course, damages the bearings. It has been found in experimentation that maintaining the bearings on the theoretical center line shortens the life of the thrust bearing from a projected several thousand hours to three or four hundred hours or less. A further problem solved by this invention is that with the increase of the concentrated load on the thrust bearing, the bearing as it wears moves in an orbital fashion which, of course, destroys the desired concentricity provided by an accurate heavy-duty spindle. Spindles made in accordance with the above procedure are in commercial use and maintain their extreme accuracy of a tenth of a thousandth of an inch over several thousand hours and even when the loads approach the maximum capacity.

It is also to be noted that the front end of this quill has mounted therein in grease seal and shield by which the grease in the live center is maintained and contamination from the outside to the inner bearings is prevented.

As a method of manufacture the heavy-duty live center is made by employing the following steps: forming a hollow quill of determined configuration; forming and supplying a rotatable spindle and carrying this spindle in the bore of the quill and with this quill in mounted condition having a work load supporting and extending beyond the quill and shaping the intermediate portion of the spindle so as to provide sufficient clearance between the bore and spindle allowing the spindle to bow with the application of a heavy load and when bowed by this load the spindle turns freely in the quill; supporting and mounting a self-aligning roller bearing on the foreportion of the spindle and adjacent thereto and to the rear thereof supplying and mounting a self-aligning spherical roller thrust bearing; forming a front bore in the quill with the front portion of the bore being precisely sized to receive and retain the outer race of the self-aligning roller bearing and to accommodate the outer race of the spherical roller thrust bearing additionally forming the rear portion of this front bore to a determined amount oversized in its diameter with respect to the diameter of the outer race of this thrust bearing and forming the rear of this front bore to provide a face surface normal to the axis of the bore, this face surface providing a stop surface for the rear face of the outer race of the thrust bearing; providing and mounting antifriction bearing means on the rear of the spindle and carrying this bearing means in the bore of the quill, this bearing means adapted to receive and support the rear of the spindle, providing a biasing means on the rear of the spindle and in association with the bearing means this biasing means provides a determined preload to the bearings carried in the front bore of the quill; providing a shoulder on the foreportion of the spindle, said shoulder adapted to engage the inner race of the self-aligning bearing and as urged by the applied preload the spindle and this bearing is drawn rearwardly and as this bearing is moved rearwardly its inner race moves the inner race of the spherical roller thrust bearing rearwardly to cause the outer race of the thrust bearing to be brought into sliding engagement with the inner rear face surface of the front bore and providing a sealing means in association with the spindle and front bore of the quill to close the front bore to dirt, coolant and the like and retain the grease in the bearings without contamination and when a heavy load is placed on the extending end of the spindle, the spindle is bowed in accordance with the load and the stiffness of the spindle, the self-aligning bearing moves into adjusted alignment with the bowing of the spindle and said outer race of the thrust bearing moves in the enlarged bore an amount equal to the bowing of the thrust bearing from the theoretical center line of the bore and to the center line of the bowed spindle enabling the thrust bearing to equally accept the end thrust on the spindle while the radial bearing is also aligned with the bow of the loaded spindle.

Terms such as "left", "right", "up", "down", "front", "back", "in", "out" and the like are applicable to the embodiments shown and described in conjunction with the drawing. These terms are merely for the purpose of description and do not necessarily apply to the position in which the live center may be constructed or used.

While a particular embodiment of the heavy-duty live center has been shown and described it is to be understood the invention is not limited thereto since modifications may be made within the scope of the accompanying claims and protection is sought to the broadest extent the prior art allows.

What is claimed is:

1. A heavy-duty live center having a workpiece capacity of 35 tons and with larger appropriate bearings and components as much as 250 tons or more, said center including: (a) a hollow quill; (b) a rotatable spindle carried in this quill, the quill in mounted condition having a work load supporting end extending beyond the quill and with the intermediate portion of the spindle sized so as to provide sufficient clearance between the bore and spindle for the spindle to bow with the application of a heavy load and when bowed by this load the spindle turns freely in the quill; (c) a self-aligning roller bearing mounted on the foreportion of the spindle and adjacent thereto and to the rear thereof is a self-aligning spherical roller thrust bearing; (d) a front bore formed in this quill, the front portion of this bore precisely sized to receive and retain the outer race of the self-aligning roller bearing and with the rear portion of this front bore made a determined amount oversized in its diameter with regard to the diameter of the outer race of the thrust bearing, the rear of this front bore having a face surface normal to the axis of the bore, this face surface providing a stop surface for the rear face of the outer race of the thrust bearing; (e) antifriction bearing means mounted on the rear of the spindle and when mounted in the bore of the quill adapted to receive and support the rear of the spindle; (f) a biasing means in association with the spindle and said bearing means on the rear of the spindle and adapted to provide a preload to the bearings carried in the front bore of the quill; (g) a shoulder provided on the foreportion of the spindle, this shoulder adapted to engage the inner race of the self-aligning bearing and as urged by the applied preload the spindle and this bearing is drawn rearwardly and as this bearing is moved rearwardly its inner race moves the inner race of the self-aligning spherical roller thrust bearing rearwardly to cause the outer race of said thrust bearing to be brought into sliding engagement with the inner rear face surface of the front bore, and (h) sealing means in association with the spindle and front bore of the quill to close the front bore to dirt, coolant and the like to retain the grease in the bearings without contamination and when a heavy load is placed on the extending end of the spindle, the spindle is bowed in accordance with the load and the stiffness of the spindle, the self-aligning bearing moves into alignment with the bowing of the spindle and the outer race of the thrust bearing is moved in the enlarged bore an amount equal to the bowing of the spindle at the inner race of the thrust bearing, this displacement of the thrust bearing from the theoretical center line of the bore and to the center line of the bowed spindle enabling the thrust bearing to equally accept the end thrust on the spindle while the radial bearing is also aligned with the bow of the loaded spindle.

2. A live center according to claim 1 further characterized as having a radial bearing capacity of about 45,000 pounds and in which the greatest spindle deflection is from sixty- to seventy-thousandths of an inch and in which the radial enlargement of the bore for displaced movement of the thrust bearing is about one-quarter of this maximum bowing of the spindle.

3. A live center according to claim 1 further characterized as having a radial bearing capacity of about 57,000 pounds and in which the greatest spindle deflection is about fifty-thousandths of an inch and in which the radial enlargement of the bore for the displaced movement of the thrust bearing is about one-quarter of this maximum bowing of the spindle.

4. A live center according to claim 1 further characterized as having a radial bearing capacity of about 93,000 pounds and in which the greatest spindle deflection is about thirtyfour-thousandths of an inch and in which the radial enlargement of the bore for the displaced movement of the thrust bearing is about one-quarter of this maximum bowing of the spindle.

5. A live center according to claim 1 further characterized as having a radial bearing capacity of about 102,000 pounds and in which the greatest spindle deflection is about thirtyfour-thousandths of an inch and in which the radial enlargement of the bore for the displaced movement of the thrust bearing is about one-quarter of this maximum bowing of the spindle.

6. A live center according to claim 1 further characterized as having a radial bearing capacity of about 128,000 pounds and in which the greatest spindle deflection is about thirty-thousandths of an inch and in which the radial enlargement of the bore for the displaced movement of the thrust bearing is about one-quarter of this maximum bowing of the spindle.

7. A live center according to claim 1 further characterized as having a radial bearing capacity of about 156,000 pounds and in which the greatest spindle deflection is about thirty-thousandths of an inch and in which the radial enlargement of the bore for the displaced movement of the thrust bearing is about one-quarter of this maximum bowing of the spindle.

8. A live center according to claim 1 in which the biasing means includes at least one "Belleville-type" spring washer which is flattened to a determined extent.

9. A live center according to claim 1 in which the sealing means is a grease retainer and in which the outer race of the radial bearing is retained in place by an adjusted internal collar means.

10. A live center as in claim 1 in which the load supporting end of the spindle has a sixty degree point portion and there is provided a flat portion formed on this end so that a drive dog may be mounted and secured on the spindle with the drive dog secured to the workpiece to prevent relative rotational movement of the workpiece and the spindle.

11. A live center as in claim 1 in which the rear of the bore in the quill is selectively closed by a plug means.

12. The method of forming and making a heavy-duty live center having a workpiece capacity of 35 tons and greater, the steps including: (a) forming a hollow quill of determined configuration; (b) forming and supplying a rotatable spindle and carrying this spindle in the bore of the quill and with this quill in mounted condition having a work load supporting end extending beyond the quill and shaping the intermediate portion of the spindle so as to provide sufficient clearance between the bore and spindle allowing the spindle to bow with the application of a heavy load and when bowed by this load the spindle turns freely in the quill; (c) supporting and mounting a self-aligning roller bearing on the foreportion of the spindle and adjacent thereto and to the rear thereof supplying and mounting a self-aligning spherical roller thrust bearing; (d) forming a front bore in the quill with the front portion of the bore being precisely sized to receive and retain the outer race of the self-aligning roller bearing, and to accommodate the outer race of the spherical roller thrust bearing additionally forming the rear portion of this front bore to a determined amount oversized in its diameter with respect to the diameter of the outer race of this thrust bearing, and forming the rear of this front bore to provide a face surface normal to the axis of the bore, this face surface providing a stop surface for the rear face of the outer race of the thrust bearing; (e) providing and mounting antifriction bearing means on the rear of the spindle and carrying this bearing means in the bore of the quill, this bearing means adapted to receive and support the rear of the spindle; (f) providing a biasing means on the rear of the spindle and in association with the bearing means this biasing means provides a determined preload to the bearings carried in the front bore of the quill; (g) providing a shoulder on the foreportion of the spindle, said shoulder adapted to engage the inner race of the self-aligning bearing and as urged by the applied preload the spindle and this bearing is drawn rearwardly and as this bearing is moved rearwardly its inner race moves the inner race of the spherical roller thrust bearing rearwardly to cause the outer race of the thrust bearing to be brought into sliding engagement with the inner rear face surface of the front bore, and (h) providing a sealing means in association with the spindle and front bore of the quill to close the front bore to dirt, coolant and the like and retain the grease in the bearings without contamination and when a heavy load is placed on the extending end of the spindle, the spindle is bowed in accordance with the load and the stiffness of the spindle, the self-aligning bearing moves into adjusted alignment with the bowing of the spindle and said outer race of the thrust bearing moves in the enlarged bore an amount equal to the bowing of the spindle at the inner race of the thrust bearing, this displacement of the thrust bearing from the theoretical center line of the bore and to the center line of the bowed spindle enabling the thrust bearing to equally accept the end thrust on the spindle while the radial bearing is also aligned with the bow of the loaded spindle.

13. The method of making a heavy-duty live center as in claim 12 which further includes the step of providing the biasing means as at least one "Belleville-type" washer which is flattened from its formed condition a selected amount by which the desired amount of preload is applied to the front bearing.

14. The method of making a heavy-duty live center as in claim 12 which further includes the step of closing the front of the quill opening by mounting a grease retainer in the opening and further includes forming the front end of the spindle with a sixty degree front portion and in association therewith there is provided a flat portion adjacent this point for the mounting and securing of a drive dog by which is prevented relative movement of the spindle and workpiece during the turning of the workpiece.

* * * * *

PO-1050
(5/69)

UNITED STATES PATENT OFFICE
CERTIFICATE OF CORRECTION

Patent No. 3,987,693      Dated October 26th, 1976

Inventor(s) Henry F. Swenson      Page 1 of 2

It is certified that error appears in the above-identified patent and that said Letters Patent are hereby corrected as shown below:

In the Abstract:

Line 13, "angular" should read -- spherical roller --;

Lines 14 and 15, "An angu-lar" should read -- A self-aligning spherical --.

Column 2, line 1, "group" should read -- groove --;
             line 4, "outrun" should read -- runout --.

Column 3, lines 26 and 27, "tapered angular roller" should read -- self-aligning spherical roller thrust --;
             lines 36 and 37, "pair of angular roller bearings back to back. These bearings are" should read -- self-aligning spherical roller radial bearing. This bearing is --;
             line 40, "tapered angular roller" should read -- self-aligning spherical roller thrust --.

Column 4, line 29, "bearngs" should read -- bearings --.

Column 5, line 64, "roller" should read -- ball --.

Column 5, line 68 and Column 6, line 1, "ta-pered" should read -- tapped --.

Column 6, line 23, "P = maximum capacity of front bearing" should read -- P = maximum capacity of front radial bearing --;

UNITED STATES PATENT OFFICE
CERTIFICATE OF CORRECTION

Patent No. 3,987,693　　　　Dated October 26th, 1976

Inventor(s) Henry F. Swenson　　　　Page 2 of 2

It is certified that error appears in the above-identified patent and that said Letters Patent are hereby corrected as shown below:

Column 6, line 49, Equation No. 2 should read --
$$\sigma = \frac{Pa (L - a)(2L - a)}{27 \, E \, I \, L} \sqrt{3a (2L - a)}$$ --

Column 6, line 56, should read -- Equasion No. 1 becomes
$$X_d = \sqrt{8c^2}$$ --

Column 7, line 13, "as" should read -- are --.

Column 8, line 15, "in" should read -- a --.

Column 10, lines 25 and 32, "thirtyfour-thousandths" should read -- thirty-four-thousandths --.

Signed and Sealed this

Eighth Day of March 1977

[SEAL]

Attest:

RUTH C. MASON
*Attesting Officer*

C. MARSHALL DANN
*Commissioner of Patents and Trademarks*